United States Patent [19]
Guglielmo et al.

[11] Patent Number: 4,467,501
[45] Date of Patent: Aug. 28, 1984

[54] APPARATUS FOR CENTRIFUGALLY EXTRACTING CRABMEAT FROM CRABS

[75] Inventors: Alfred R. Guglielmo, 6125 Villa Ashley Dr., Baton Rouge, La. 70806; John B. Coast, Baton Rouge, La.

[73] Assignee: Alfred R. Guglielmo, Baton Rouge, La.

[21] Appl. No.: 465,469

[22] Filed: Feb. 10, 1983

[51] Int. Cl.$^3$ ............................................. A22C 29/00
[52] U.S. Cl. ............................................. 17/71; 17/48
[58] Field of Search .................... 17/71, 46, 73, 53, 48

[56] References Cited

U.S. PATENT DOCUMENTS

| | | | |
|---|---|---|---|
| 1,655,583 | 1/1928 | Umrath | 17/71 |
| 2,522,578 | 9/1950 | Johnson | 17/45 |
| 2,771,631 | 11/1956 | Hiller | 17/71 |
| 2,838,786 | 6/1958 | Ward | 17/71 |
| 3,441,981 | 5/1969 | Tolley | 17/71 |
| 3,555,595 | 1/1971 | Tolley | 17/71 |
| 3,597,792 | 8/1971 | Lockerby | 17/71 |
| 3,719,967 | 3/1973 | Craig | 17/71 |
| 3,750,234 | 8/1973 | Rodgers et al. | 17/71 |
| 3,777,332 | 12/1973 | Boisvert | 17/71 |

Primary Examiner—Willie G. Abercrombie
Attorney, Agent, or Firm—Charles C. Garvey, Jr.

[57] ABSTRACT

An improved apparatus for centrifugally extracting crabmeat from crabs provides a frame which supports a driven rotary shaft mounted thereon. A first annular plate is mounted for rotation on the shaft and driven thereby. A plurality of closely spaced wire support members radiate from the first plate and have a common path of rotation when the plate is rotated by the drive shaft. A second annular plate is movably mounted upon the frame with respect to the first plate between "loading" and "spinning" positions. A plurality of closely spaced, radially positioned, pointed spikes depend from the second plate and are positioned to intersect the path of rotation of the wire support members in the "spinning," the spikes being spaced from the path in the loading position. A lifting mechanism moves the second plate vertically between the "spinning" and "loading" positions. In the "loading" position the lifting mechanism spaces the second plate vertically above the first plate so that a plurality of crab body sections can be added to the periphery of the first annular plate by placing them in a circular configuration around the first plate and upon the wire support members. In the "spinning" position, the lifting mechanism lowers the second annular plate so that the spikes penetrate the crab body sections and the path of rotation of the wire members. The wire support members secure the crab body sections so that the spikes can penetrate them fully. The spikes and wire members thereafter retain the crab body sections during centrifuging while the spaced configuration of the wire support members and spikes allows ample opening for crabmeat to travel away from the crab body sections responsive to the centrifuging.

7 Claims, 6 Drawing Figures

APPARATUS FOR CENTRIFUGALLY EXTRACTING CRABMEAT FROM CRABS

BACKGROUND OF THE INVENTION

1. Technical Field

The present invention relates to improved carriages for centrifugally extracting crabmeat from crab body sections. Even more particularly, the present invention relates to a multisection rotatable carriage which are powered to disassemble during loading and converge prior to and during centrifuging which allows a large plurality of crab body sections to be simultaneously processed.

2. General Background

Numerous devices have been patented which have attempted to solve the problem of removing crabmeat from the exoskeleton of crab body sections, an operation which is typically performed by hand by consumers in restaurants, and at home after boiling or otherwise preparing crabs for consumption. Many of the patented devices are directed to commercialization of crab picking and are referred to generally as crab processing devices.

It has been known in the past to utilize centrifuging or "spinning" of crab bodies in a rotational path so as to extract the crabmeat. See, for example, a very early patent which uses a centrifugal machine for shelling crustacea such as crabs. U.S. Pat. No. 1,175,037 issued Mar. 4, 1916 is entitled "Apparatus for Shelling Crustacea." In that patent there is seen a centrifugal retainer having semi-circular receiving pans or receptacles for the meat and supports or racks for holding the sections of the "fish" to be shelled. A spindle is provided for rotating the centrifugal retainer.

Various other improvements to the concept of centrifugal extraction of crabmeat have also been patented.

U.S. Pat. No. 1,655,583 entitled "Method and Apparatus for Shelling Crustacea" provides a motor-driven rotatable pan having clamps thereinside to secure the crab body sections so that during centrifuging the sections will be retained and the meat extracted from the crab body sections will collect on the periphery of the pan.

U.S. Pat. No. 2,104,072 entitled "Process of an Apparatus for Treating Crustacea" uses another rotatably driven bowl. In the process of preparing the meat of the crustacea in that patent, the patentee subjects the crustacean to centrifugal action in order to separate the meat from the shell and further utilizes the same centrifugal action to affect washing of the separated meat.

U.S. Pat. No. 2,522,578 entitled "Recovery of Crabmeat" shows a coring machine which processes the crab and produces a crab body section by making a circular cut through the ventril surface of the crab body and through the meat and skeletal parts within the body. After removing the core from the crab the meat is extracted therefrom by centrifugal action.

Another patent which cores and centrifugally removes crabmeat is entitled "Apparatus for Recovery of Crabmeat" which is the subject of U.S. Pat. No. 2,525,604.

U.S. Pat. No. 2,771,630 is entitled "Crabmeat Extractor." In that patent after coring a section of the crab body from the crab, the core is rotated about its axis in order to remove the crabmeat.

U.S. Pat. No. 3,229,325 entitled "Apparatus for Extracting Crabmeat" shows a centrifugal device having a carriage for holding a plurality of crab body sections. The carriage includes a spinning basket which features a first and second set of plurality of upstanding and generally parallel pins which are supported at their lower ends from a spinning base with the pins being arranged in circular patterns and disposed concentrically about the axis of rotation. The second set of the pins is disposed radially inwardly of the first set. The crabs are placed between the inner and outer sets of pins and are held down by an annular plate which has apertures that allow the pins to pass through it.

A more recent patent is U.S. Pat. No. 3,597,792 entitled "Crabmeat Extraction Apparatus and Method." The machine which is the subject of '792 patent provides a machine and method for extracting meat from the body shells of crabs by the employment of centrifugal force characterized by structures and procedures which permit operation at different speeds operative to selectively and successively extract the more valuable, relatively large lump meat sections in substantially unbroken condition; followed by extraction of the smaller, less valuable flake meat sections by centrifugal rotation at a higher speed. Part of the apparatus utilizes a rotating tray which carries a plurality of radially extending, angularly spaced clips which are pivoted on upstanding hinge lugs and biased by means of a spring to normally urge the forward end of the clip into a closed position. The spring biased clips and cooperating teeth function to securely hold crab bodies and restrain them against centrifugal force during rotation of the trays. A single crab is secured by each of the clamps.

In U.S. Pat. No. 3,548,449 entitled "Crabmeat Extraction Method" there is described a method for removing crabmeat from crab body sections which uses two rotating speeds as part of the method. The first rotating speed is at a lower speed to remove larger lump sections of crabmeat while a higher speed rotation rotates the crab body sections to remove the smaller pieces of meat.

General Discussion of the Present Invention

The present invention solves the prior art problems and shortcomings by providing an improved apparatus for centrifugally extracting crabmeat simultaneously from a plurality of crab body sections. In the apparatus of the present invention there is provided an improved carriage having two parts which assume a spaced apart and converged position respectively during loading of the crab body sections and thereafter during spinning. The two sections are powered upon a supporting frame to move between the two "loading" and "spinning" positions. In the preferred embodiment the carriage comprises in part a plurality of pointed spikes which actually penetrate the crab body sections as the two carriage sections move together, the spikes being so positioned to intersect the plane of rotation at an angle so that the spikes thereafter secure the crab body sections which are subjected to high angular velocity and acceleration when they are spun in a rotational path at great speeds. The apparatus of the present invention provides a frame and a driven rotary shaft is mounted upon the frame. A first annular plane forms one of the sections of the carriage and is mounted for rotation upon the shaft. The first plate provides a plurality of closely spaced wire support members radiating from the first plate and having a common path of rotation when the first annular plate is spun by the driven rotary shaft.

A second annular plate which comprises the other section of the carriage is movably mounted on the frame with respect to the first plate between "loading" and "spinning" positions. A plurality of closely spaced, radially positioned, pointed spikes depend from the second plate and are positioned to intersect the path of rotation of the wire support members in the "spinning," the spikes being spaced from the path in the "loading" position. An intermediate plate which functions as a "wiper" is positioned between the two annular plates and is biased to wipe the crab body sections from the spikes responsive to movement of the second annular plate from the "spinning" to the "loading" position so that all of the crab body sections are simultaneously disengaged from the spikes so that they can be quickly and efficiently removed from the carriage after processing.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 1:
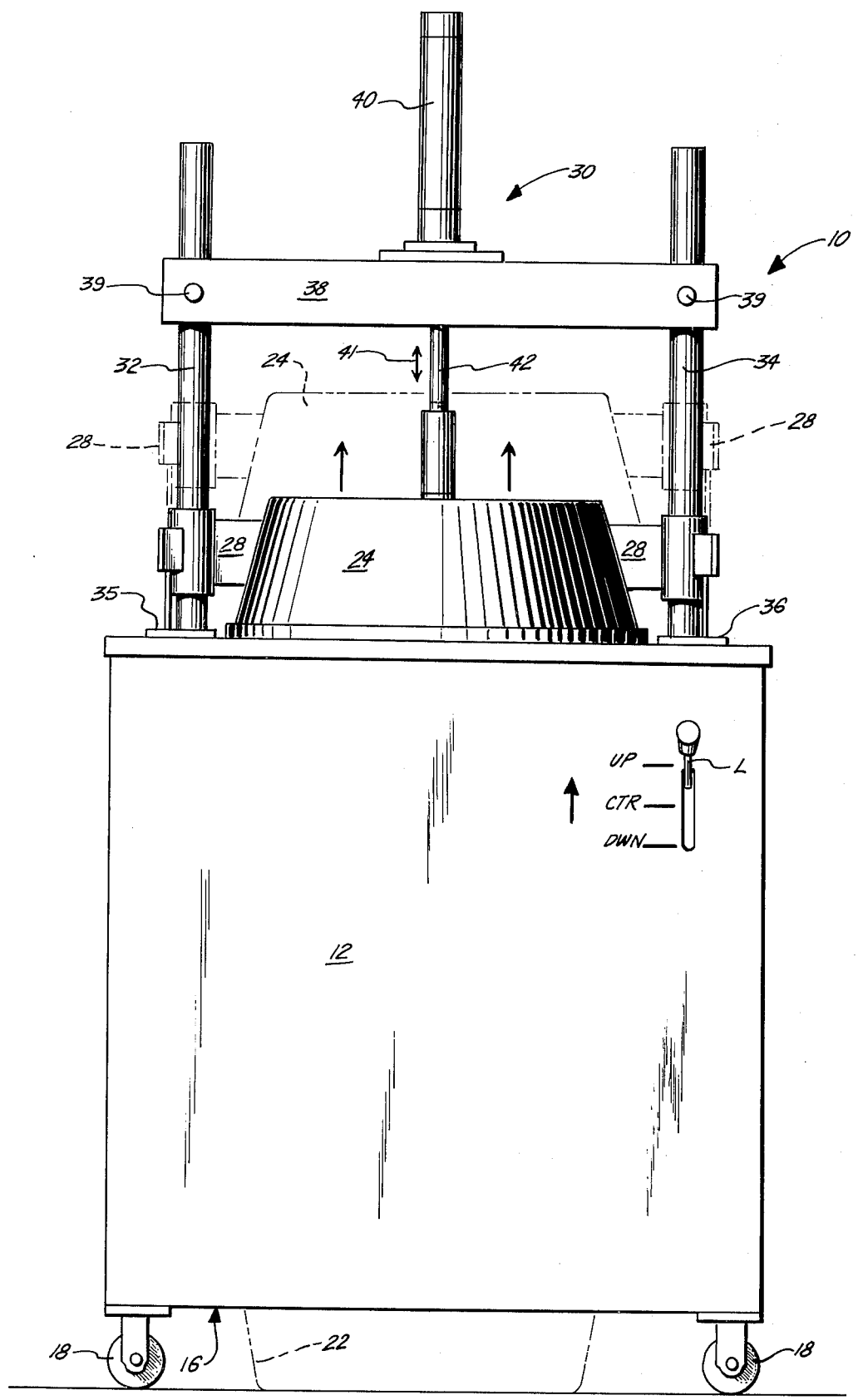
FIG. 1 is an elevational view of the preferred embodiment of the apparatus of the present invention.
Figure 2:
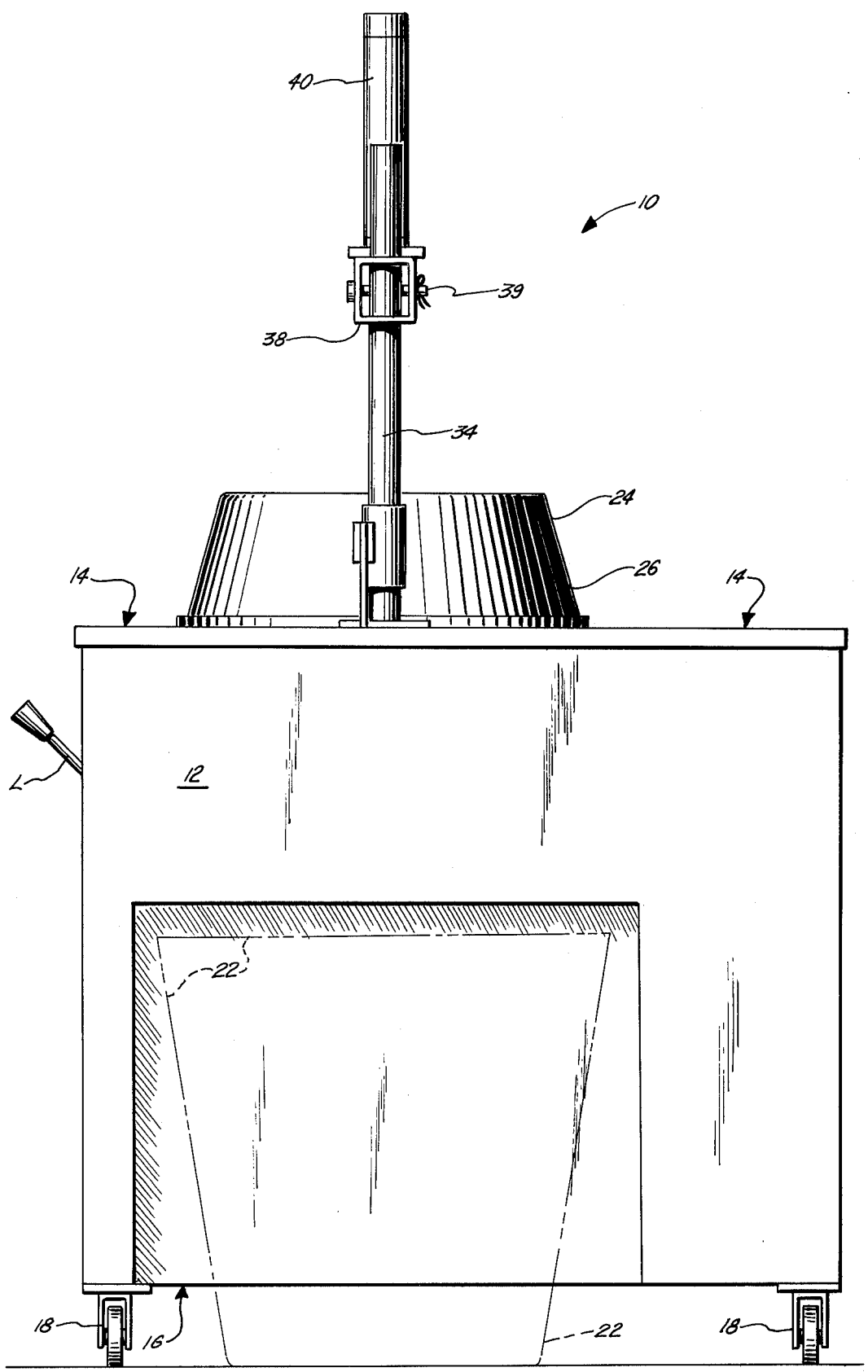
FIG. 2 is a side elevational view of the preferred embodiment of the apparatus of the present invention.

FIGS. 1 and 2 show generally the preferred embodiment of the apparatus of the present invention designated by the numeral 10. Centrifugal crabmeat extraction apparatus 10 comprises generally a frame 12 having an upper surface 14 with an opening 15 which allows crabmeat to fall through the opening into a container 22. The underside 16 of frame 12 provides a plurality of casters 18 or other supports as desired. A dished cover 24 having a top surface 25 and side walls 26 is movably mounted by a lifting mechanism 30 between "loading" position (phantom lines in FIG. 1), and a "spinning" position shown in FIG. 3 and in hard lines in FIG. 1. Note that the lower edge 27 of dished cover 24 is closely positioned about the periphery of opening 15. A laterally extending guide 28 secures the outer edge of dished cover 24 to the lifting mechanism at columns 32, 34. Lifting mechanism 30 is supported upon the upper surface 14 of frame 12 and comprises a pair of spaced apart vertical columns 32, 34, each of which is provided respectively with feet 35, 36. A cross beam 38 is secured by pinned connections 39 to the vertical columns 32, 34. A piston assembly 40 is attached in a vertical fashion and is supported by the cross beam 38. Arrows 41 in FIG. 1 illustrate the upward and downward movement of pushrod 42 of piston 40 which as will be described more fully hereinafter moves the carriage C between "loading" and "spinning" positions. A conventional hydraulic control valve with an actuating lever can be used to actuate piston 40 to raise or lower carriage C. In FIGS. 1 and 2, lever "L" is shown having positions "up" and "down" corresponding to the up or "loading" position of FIG. 4 and the down or "spinning" position of FIG. 3. CTR designates a neutral "center" position of lever L. A sleeve 44 is affixed to the lower portion of pushrod 42 with set screw 48 securing the sleeve thereto. 46 designates a connection by welding, for example, of sleeve 44 to dished cover 24. Annular flange 50 on pushrod 42 is an enlarged diameter section thereof which retains plate 60 thereon as will be described more fully hereinafter. Thrust bearings 52, 54 are spaced on either side of plate 60 with bearing 54 occupying a position between annular flange 50 and plate 60 and bearing 52 occupying a position between plate 60 and sleeve 44. As will be described more fully hereinafter, plate 60 rotates during centrifuging while sleeve 44, pushrod 42 and annular flange 50 do not. Pushrod 42 passes through plate 60 at opening 61.

Figure 3:
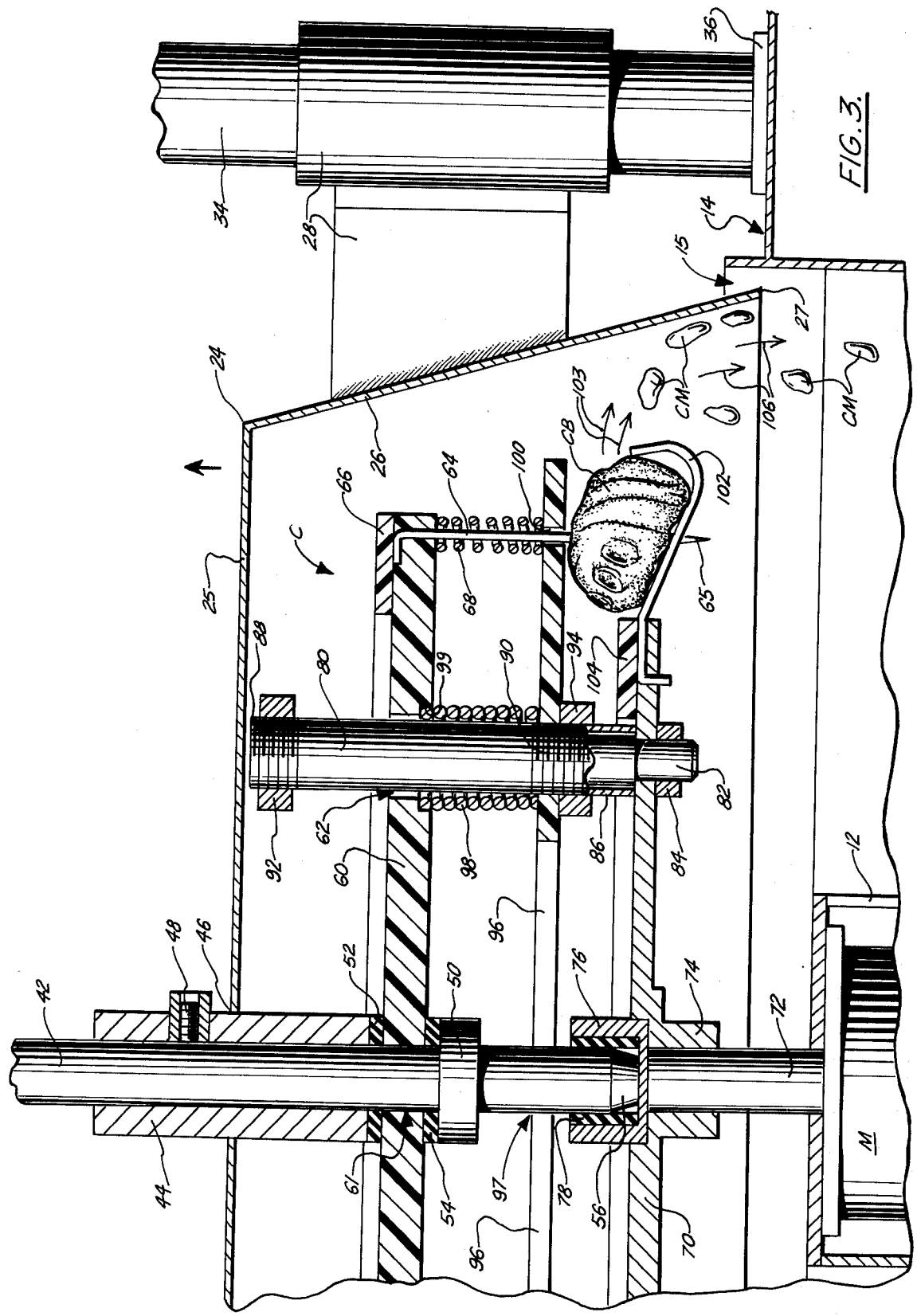
FIG. 3 is a sectional, fragmentary view of the preferred embodiment of the present invention illustrating the rotating carriage when in the "spinning" position.
Figure 4:
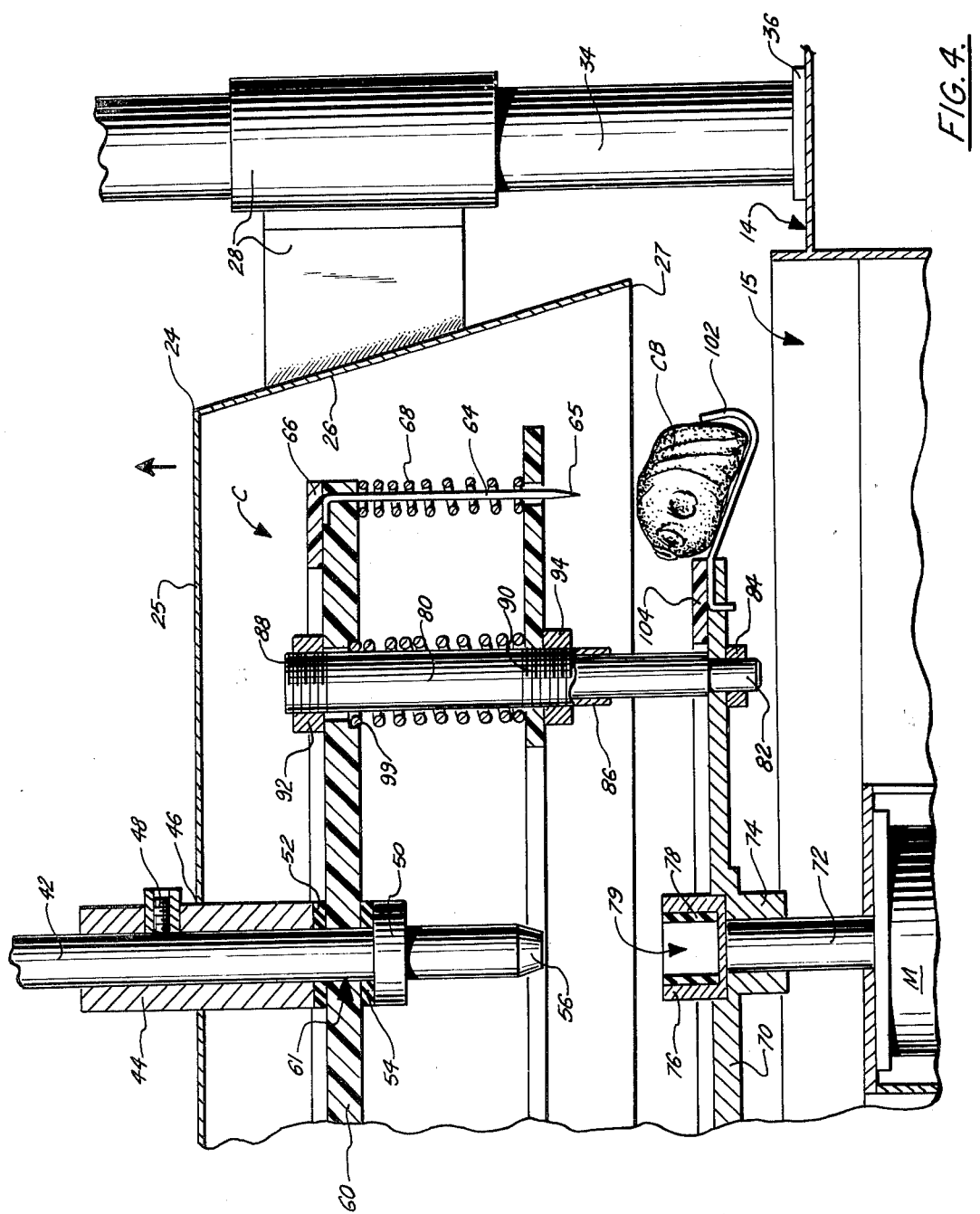
FIG. 4 is a sectional, fragmentary view of the preferred embodiment of the apparatus of the present invention illustrating the rotating carriage when in the "loading" position.
Figure 5:
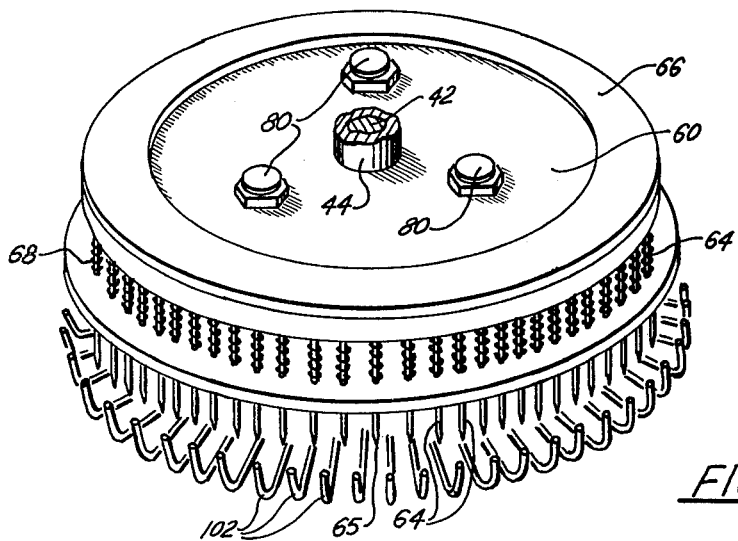
FIG. 5 is a perspective view of the carriage portion of the preferred embodiment of the apparatus of the present invention.
Figure 6:
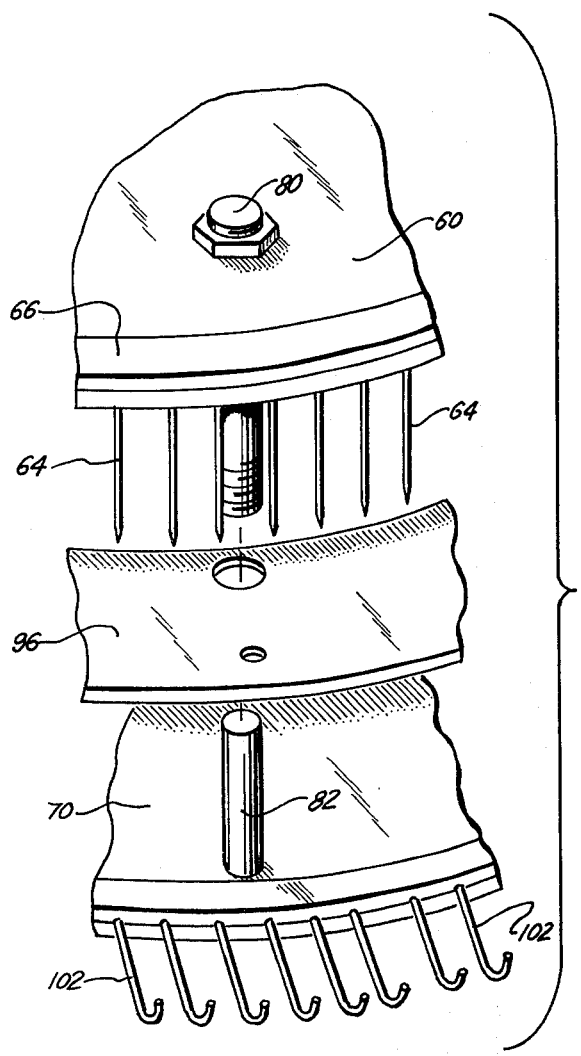
FIG. 6 is an exploded, perspective view of the carriage portion of the preferred embodiment of the apparatus of the present invention.

Another plate 70 is shown in FIGS. 3 and 4. Plate 70 and plate 60 form a carriage C as will be described more fully hereinafter. Lower plate 70 which will be referred to hereinafter as the "first annular plate" is a rotatably driven plate which is attached to drive shaft 72 by coupling 74. Motor "M" rotates shaft 72. An indexing collar 76 is affixed to plate 70, having a common rotational axis with shaft 72. Indexing collar 72 provides an upwardly facing opening 79 which is lined by liner 78 which would be a preferably frictionless material such as Teflon or the like. In FIG. 3 it can be seen that pushrod 42 has assumed its lowermost position which is the "spinning" position. The lowermost beveled end 56 of pushrod 42 in the "spinning" position descends and indexes into collar 76 so that shaft 72 and pushrod 42 are co-linear having common axes during the spinning operation which aligns and stabilizes the apparatus during spinning.

Attention will now be directed to the details of construction of the multi-section carriage which is referred to generally in the drawings and particularly in FIGS. 3 and 4 by the letter "C."

Carriage C comprises a first annular rotating plate 70 and supports at its periphery a plurality of closely spaced wire support members 102 which radiate from first plate 70 outwardly and which have a common path during rotation. An annular backing ring 104 is secured to first annular plate 70 by bolting or other suitable means so that the wire support members are secured to the plate during centrifuging, yet can be disassembled for repair or replacement.

Second annular plate 60 is movably mounted upon frame 12 by lifting mechanism 30 and more particularly by pushrod 42 responsive to its upward and downward movement as actuated by lifting mechanism 30. Second annular plate 60 is movable upwardly and downwardly with respect to first annular plate 70 between "spinning" (FIG. 3) and "loading" (FIG. 4) positions. A plurality of closely spaced, radially positioned, pointed spikes 64, backed by annular ring 66, depend from second plate 60 and are positioned generally vertically in the preferred embodiment so as to intersect at their lower edge 65 the path of rotation of wire support members 102 when in the "spinning" position. The spikes are spaced from the path of rotation of wire support members 102 in the "loading" position of FIG. 4 such as, for example, when a plurality of crab body sections need to be added to the carriage prior to processing. In FIGS. 3 and 4, crab body sections are designed generally as "CB." Rotation is transferred from plate 70 to plate 60 by means of telescoping pin assemblies 80 of which three are shown in the preferred embodiment (see FIGS. 3–6).

Plate 60 provides a plurality of openings 62 which are of an internal diameter approximately equal to or slightly larger than the external diameter of telescoping pins 80. When pushrod 42 is moved upwardly by piston 40, an internal pin 82 of telescoping pin assembly 80 is retained by nut 84 at plate 70. An outer sleeve 86 moves upwardly as plate 60 moves upwardly. As plate 60 moves upwardly this relieves the compression which has been exerted upon spring 98 allowing spring 98 to expand. This action spaces plate 60 from intermediate plate 96 which functions as both a cover for crab body sections CB during centrifuging, but more particularly as a wiper to insure that each crab body section will fall from its corresponding spike 64 after centrifuging when the apparatus 10 moves from the spinning (FIG. 3) to the loading (FIG. 4) position so that the empty crab bodies can be removed and new ones loaded onto wires 102. In that regard wiper plate 96 provides openings 100 through which spikes 64 pass. As a further measure to insure proper spacing of wiper plate 96 from second annular plate 60 as pushrod 42 moves upwardly, a plurality of springs 68 are provided to the plurality of spike 64 which springs expand when pushrod 42 moves up. Sleeve 80 is threaded firstly at 88 and secondly at 90. Threads 88 are occupied by nut 92 while threads 90 are occupied by nut 94. These are adjustment nuts allowing, for example, one-half inch of adjustment. Nut 92 also functions as a stop to limit upward movement of plate 60 as shown in FIG. 4. Further, nut 94 provides an adjustment for affixing the position of wiper plate 96 with respect to the end portion 65 of spikes 64. A central opening 97 in wiper plate 96 allows pushrod 42 to pass therethrough and operate independently with respect to plate 96. Plate 96 is actually supported by nuts 94 in combination with springs 98. A recess 99 is provided in plate 60 for receiving the upper end of spring 98.

During spinning, crabmeat moves laterally away from the axis of rotation of drive shaft 72 as indicated by arrows 103. Once crabmeat portions designated in the drawings as "CM" are free of crab body sections CB, they are no longer subject to centrifugal force and will hit the side wall 26 of dished cover 24. Thereafter, gravitational force pulls them downwardly as indicated by the arrows 106 in FIGS. 3 and 4 and they will fall through opening 15 in cover 14 and into collection container 22.

Because many varying and different embodiments may be made within the scope of the inventive concept herein taught, and because many modifications may be made in the embodiment herein detailed in accordance with the descriptive requirement of the law, it is to be understood that the details herein are to be interpreted as illustrative and not in a limiting sense.

What is claimed as invention is:

1. An apparatus for centrifugally extracting meat from crab body sections comprising:
   a frame;
   a driven rotary shaft mounted on the frame;
   a first annular plate mounted for rotation on the shaft;
   a plurality of closely spaced wire support members radiating from said first plate and having a common path during rotation;
   a second annular plate movably mounted on the frame with respect to the first plate between "loading" and "spinning" positions;
   a plurality of closely spaced radially positioned pointed spikes depending from said second plate and positioned to intersect the path of rotation of the wire support members in the "spinning" positions, the spikes being spaced from the path in the "loading" position; and
   means for forming a connection between the first and second annular plates so that rotational force can be transferred from the first plate when rotated to the second plate.

2. The apparatus of claim 1 wherein the first and second annular plates are disposed upon a common axis of rotation in both the "loading" and "spinning" positions.

3. The apparatus of claim 1 further comprising a powered lifting mechanism for moving the second annular plate upon the frame between the lifting and spinning positions.

4. The apparatus of claim 1 wherein said connection forming means comprises a plurality of radially spaced telescoping pins which extend between the two plates.

5. The apparatus of claim 1 wherein each of the plurality of wire support members are curved to fit the underside of and to confine against lateral movement during centrifuging, the crab body sections.

6. The apparatus of claim 1 further comprising intermediate wiper plate means positioned generally between said first and second annular plates for simultaneously wiping each of the plurality of spikes clean of crab body sections responsive to movement of said second annular plate from the "spinning" to the "loading" position.

7. The apparatus of claim 1 wherein each of said telescoping pin means comprises a pin secured to the first annular plate, a sleeve disposed to telescope with respect to the pin, the sleeve penetrating a provided opening on the annular plate, and stop means being disposed at end portions of the sleeve for preventing removal of the sleeve from the plate at one end portion and at the other end portion a spring being disposed between the plate and the stop means.

* * * * *